(12) United States Patent
Yui et al.

(10) Patent No.: US 7,148,909 B2
(45) Date of Patent: Dec. 12, 2006

(54) IMAGE DISPLAY SYSTEM CAPABLE OF DISPLAYING AND SCALING IMAGES ON PLURALITY OF IMAGE SOURCES AND DISPLAY CONTROL METHOD THEREFOR

(75) Inventors: Hideaki Yui, Kawasaki (JP); Katsuhiro Miyamoto, Isehara (JP); Yuichi Matsumoto, Hiratsuka (JP); Shuntaro Aratani, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/316,023

(22) Filed: May 21, 1999

(65) Prior Publication Data

US 2002/0175924 A1 Nov. 28, 2002

(30) Foreign Application Priority Data

May 27, 1998 (JP) ............................... 10-161523
Feb. 22, 1999 (JP) ............................... 11-042794

(51) Int. Cl.
*G09G 5/12* (2006.01)

(52) U.S. Cl. .................................................. 345/660

(58) Field of Classification Search ................ 345/115, 345/127, 132, 158, 629, 660
See application file for complete search history.

(56) References Cited

U.S. PATENT DOCUMENTS

| | | | | |
|---|---|---|---|---|
| 4,710,762 A | * | 12/1987 | Yamada ...................... | 340/721 |
| 4,751,507 A | * | 6/1988 | Hama et al. ................. | 340/724 |
| 4,961,072 A | * | 10/1990 | Sekikawa .................... | 340/731 |
| 5,353,041 A | | 10/1994 | Miyamoto et al. ........... | 345/97 |
| 5,408,247 A | | 4/1995 | Enomoto et al. ........... | 345/100 |
| 5,420,603 A | | 5/1995 | Tsuboyama et al. .......... | 345/87 |
| 5,425,137 A | * | 6/1995 | Mohan et al. .............. | 345/619 |
| 5,454,371 A | * | 10/1995 | Fenster et al. .............. | 600/443 |
| 5,481,274 A | * | 1/1996 | Aratani et al. ................ | 345/98 |
| 5,488,385 A | * | 1/1996 | Singhal et al. ................. | 345/3 |
| 5,521,722 A | * | 5/1996 | Colvill et al. ............... | 358/500 |
| 5,576,732 A | * | 11/1996 | Minakuchi et al. ......... | 345/667 |
| 5,602,565 A | * | 2/1997 | Takeuchi .................... | 345/119 |
| 5,635,951 A | * | 6/1997 | Takahashi ................... | 345/671 |
| 5,677,741 A | | 10/1997 | Yui ........................... | 348/649 |
| 5,715,385 A | * | 2/1998 | Stearns et al. .............. | 345/648 |

(Continued)

FOREIGN PATENT DOCUMENTS

JP 2-3089 1/1990

(Continued)

OTHER PUBLICATIONS

Toolglass and Magic Lenses: The See Through Interface, Eric A. Bier, Maureen C. Stone, Ken Pier, William Buxton†, Tony D. DeRose Xerox PARC, 3333 Coyote Hill Road, Palo Alto, CA 94304, University of Toronto, University of Washington.*

(Continued)

*Primary Examiner*—Kee M. Tung
*Assistant Examiner*—J. Amini
(74) *Attorney, Agent, or Firm*—Fitzpatrick, Cella, Harper & Scinto

(57) ABSTRACT

A multiple image display system includes a selection portion to select areas on a screen of a display portion at which input images are to be displayed, detection portions disposed at least at three different points to detect locations of the areas on the screen, and a display control portion to scale input images so that the images are displayed in a size corresponding to a calculated scaling magnification, as well as an image display method and a memory medium applicable to the multiple image display system. This image display system permits expanding and contracting images urgently even during presentation.

28 Claims, 9 Drawing Sheets

U.S. PATENT DOCUMENTS

| | | | | |
|---|---|---|---|---|
| 5,729,704 | A * | 3/1998 | Stone et al. | 715/804 |
| 5,731,805 | A * | 3/1998 | Tognazzini et al. | 345/156 |
| 5,736,974 | A * | 4/1998 | Selker | 345/146 |
| 5,815,135 | A * | 9/1998 | Yui et al. | 345/97 |
| 5,838,336 | A * | 11/1998 | Ross | 345/508 |
| 5,856,821 | A * | 1/1999 | Funahashi | 345/130 |
| 5,867,166 | A * | 2/1999 | Myhrvold et al. | 345/419 |
| 5,889,517 | A * | 3/1999 | Ueda et al. | 345/339 |
| 5,912,713 | A | 6/1999 | Tsunoda et al. | 348/540 |
| 5,929,841 | A * | 7/1999 | Fujii | 715/857 |
| 5,940,089 | A * | 8/1999 | Killiplane et al. | 345/515 |
| 6,002,875 | A | 12/1999 | Stolberg | 395/709 |
| 6,009,232 | A * | 12/1999 | Sakaegi et al. | 386/70 |
| 6,023,583 | A | 2/2000 | Honda | 395/709 |
| 6,208,354 | B1 * | 3/2001 | Porter | 345/435 |
| 6,501,515 | B1 * | 12/2002 | Iwamura | 348/734 |
| 6,538,675 | B1 * | 3/2003 | Aratani et al. | 345/856 |
| 6,727,909 | B1 * | 4/2004 | Matsumura et al. | 345/629 |

FOREIGN PATENT DOCUMENTS

| | | |
|---|---|---|
| JP | 5-27938 | 2/1993 |
| JP | 6-348412 | 12/1994 |
| JP | 8-106542 | 4/1996 |
| JP | 8-320878 | 12/1996 |
| JP | 10-124325 | 5/1998 |
| JP | 10-124327 | 5/1998 |

OTHER PUBLICATIONS

The Continuous Zoom: A Constrained Fisheye, Technique for Viewing and Navigating Large, Information Spaces Lyn Bartram, Albert Hot, John Dill and Frank Henigman Graphics and Multimedia Research Laboratory Center for Systems Science Simon Fraser University.*

Graphical fisheye views of graphsManojit Sarkar, Marc H. Brown, Jun. 1992, Proceedings of the SIGCHI conference on Human factors in computing systems Publisher: ACM Press.*

The movable filter as a user interface tool, Maureen C. Stone, Ken Fishkin, Eric A. Bier Apr. 1994 Proceedings of the SIGCHI conference on Human factors in computing systems: celebrating interdependence Publisher: ACM Press.*

Texture mapping 3D models of real-world scenes; Frederick M. Weinhaus, Venkat Devarajan Dec. 1997 ACM Computing Surveys (CSUR), vol. 29 Issue 4 Publisher: ACM Press.*

Managing level of detail through peripheral degradation: effects on search perfor . . . Benjamin Watson, Neff Walker, Larry F. Hodges, Aileen Worden Dec. 1997 ACM Transactions on Computer-Human Interaction (TOCHI), vol. 4 Issue 4 Publisher: ACM Press.*

Transparent layered user interfaces: an evaluatBeverly L. Harrison, Hiroshi Ishii, Kim J. Vicente, William A. S. Buxton May 1995 Proceedings of the SIGCHI conference on Human factors in computing systems Publisher: ACM Press/Addison-Wesley Publishing Co.*

* cited by examiner

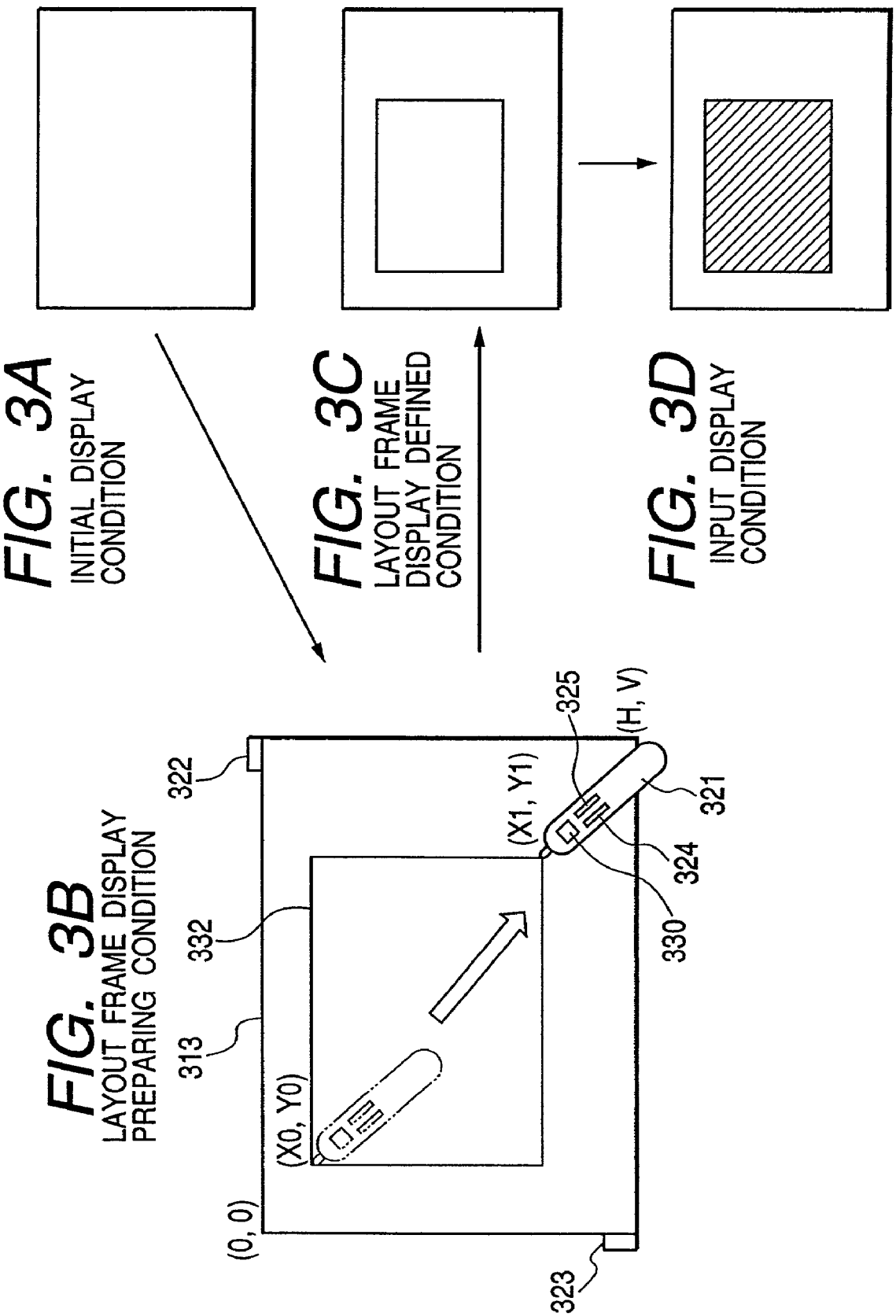

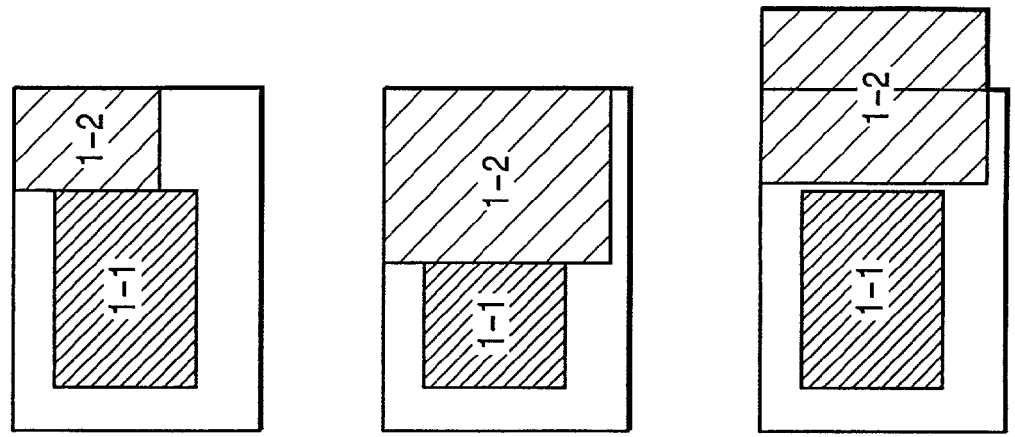
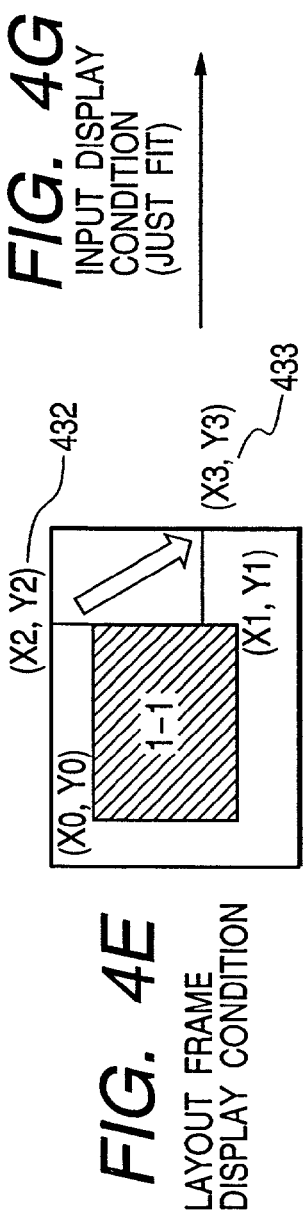
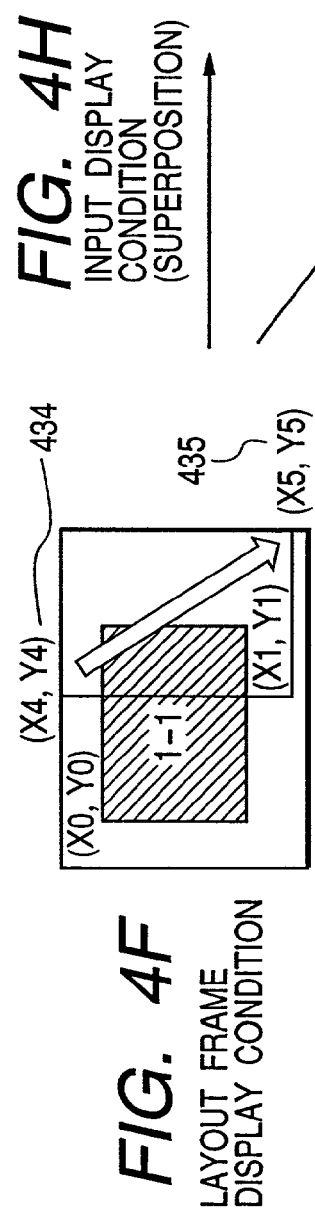
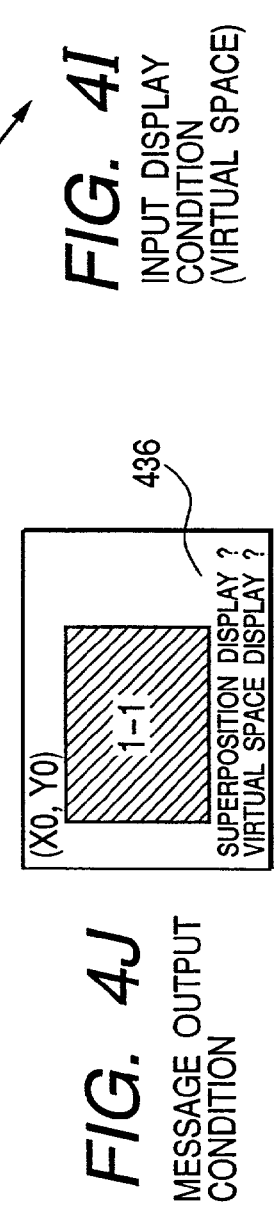

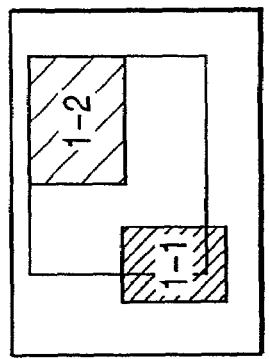
FIG. 5K INITIAL DISPLAY CONDITION
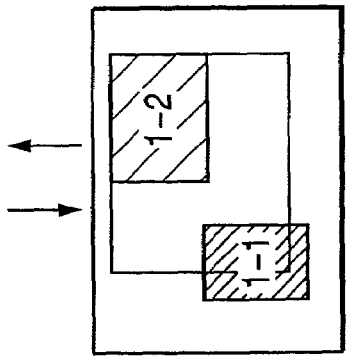
FIG. 5L LAYOUT FRAME DISPLAY CONDITION
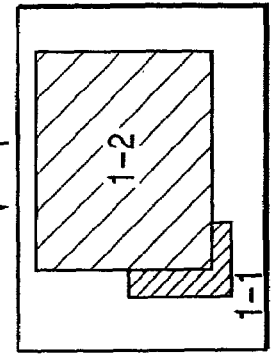
FIG. 5M EXPANSION DISPLAY CONDITION
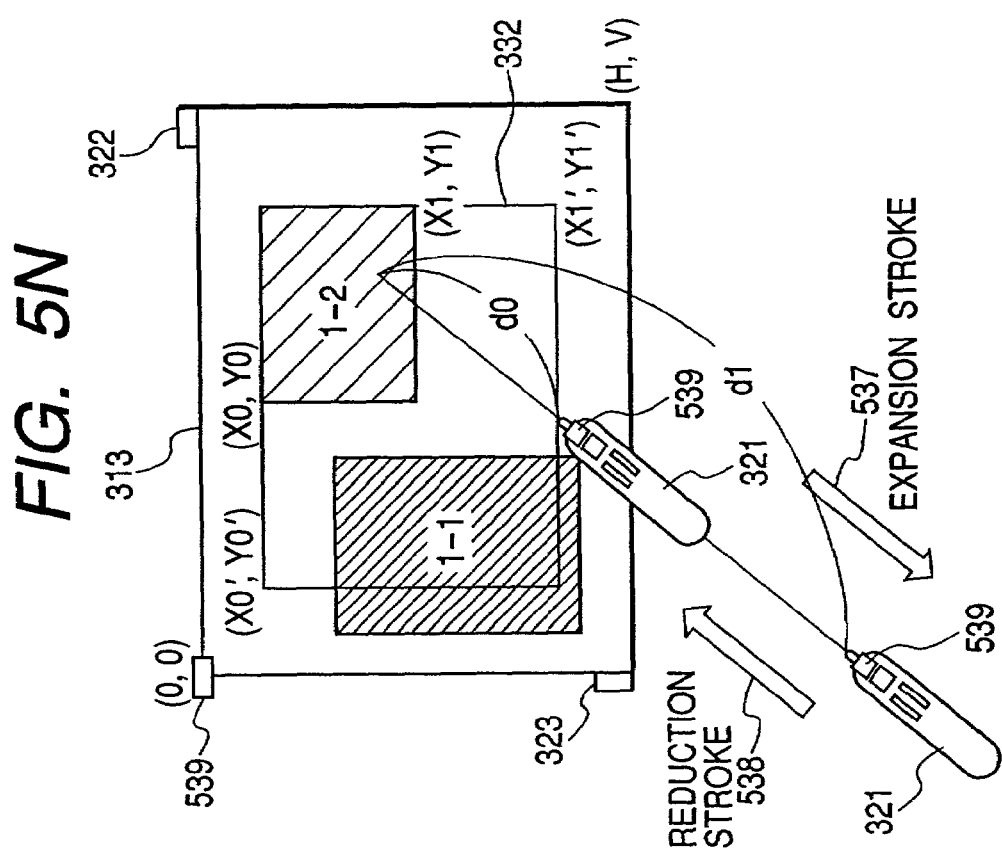
FIG. 5N

IMAGE DISPLAY SYSTEM CAPABLE OF DISPLAYING AND SCALING IMAGES ON PLURALITY OF IMAGE SOURCES AND DISPLAY CONTROL METHOD THEREFOR

BACKGROUND OF THE INVENTION

1. Field of the Invention

The present invention relates to a display system, an image display method and a storage medium (memory medium), and more specifically a display system, an image display method and a storage medium (memory medium) which are preferable to provide smooth and comfortable operating environments for presentation or conferences using a plurality of image sources.

2. Related Background Art

Presentation (persuasive describing performance in conferences or the like) has been carried out more frequently in these days while displaying image data prepared with notebook type personal computers (notebook PCs) on large display apparatus, for example, liquid crystal projectors and plasma displays. On the other hand, there has been produced a current product where attendants save data in computers for perusal of the data and exchange of data files in the conferences. Under these circumstances, it is required for an image display system to have a function to display images from a plurality of image sources at the same time, and another function for centralized control of the data and displayed image.

To display a plurality of image sources at the same time, however, the conventional large display apparatus for presentation requires preliminary determination of display locations in advance to select display layouts on screens of the large display apparatus or confirmation of display formats (numbers of display lines, dots and colors) on image sources of attendants and determination of a display layout for each image source through complicated manual settings of display driver software by presenters before the conferences.

Furthermore, conditions often occur where attendants seated at some locations in the conferences cannot look at characters and images provided in the display layouts determined in advance by the presenters. In such cases, the attendants are obliged to reseat themselves or intercept the conferences to confirm what is being displayed by the presenters and in worst cases the presenters must recorrect the display layouts with the display driver software described above.

However, the related art described above requires determination or recorrection of the layouts of the plurality of image sources by way of the display driver software before and/or during the conferences as described above, thereby posing a lot of problems that it constitutes causes to hinder smooth proceedings of conferences and inadequate user interfaces requiring excessive setting times in multiple image display conference systems which have an original purpose to enhance conferential efficiencies.

SUMMARY OF THE INVENTION

The present invention which has been achieved in view of the problems described above has an object to provide a display system, an image display method and a memory medium which provide environments for smooth and comfortable operating environments for presentations in conferences or the like using a plurality of image sources.

In order to attain the object described above, the present invention provides a display system which is characterized in that it is capable of simultaneously or independently displaying images input from a plurality of image sources, and that it comprises a selection portion which selects areas on a screen of a display portion at which the input images are to be displayed, detection portions which detect locations of the areas selected on the screen and a display control portion which scales the input images to display the images in a predetermined size on the basis of input image data and detected display location data.

In order to attain the object described above, the present invention provides a display system which is characterized in that it comprises a communication portion which transmits data selected by the selection portion to a display system main unit, and that the display control portion which calculates a scaling magnification ratio for display data relative to the input image data on the basis of a horizontal resolution and a number of vertical lines of the input image data as well as the detected display location data so that the input images are displayed at a size corresponding to the scaling magnification.

In order to attain the object described above, the present invention provides a display system which is characterized in that the selection portion comprises a selection side transmission/reception portion which transfers and receives infrared rays, a counting portion which counts a propagation time of infrared rays from the selection portion to the detection portions which are targets, and a control portion which issues data with identification codes and detects locations of the selection portion and the target detection portions, that the detection portions comprise a detection side transmission/reception portion which transfers and receives the infrared rays and a comparison portion which repeats reception data to the selection portion when the identification codes transmitted from the selection portion are coincident, and that the detection portions are disposed on a horizontal axis and a vertical axis on the screen of the display portion.

BRIEF DESCRIPTION OF THE DRAWINGS

FIGS. 3A, 3B, 3C and 3D are descriptive diagrams showing an image to form a layout display frame using an X axis infrared ray repeater and a Y axis infrared ray repeater in the first embodiment of the present invention;

FIGS. 4E, 4F, 4G, 4H, 4I and 4J are descriptive diagrams exemplifying display layouts for images input from a plurality of image sources in the first embodiment of the present invention;

FIGS. 5K, 5L, 5M and 5N are descriptive diagrams showing an image to modify a layout display frame using an origin infrared ray repeater in the second embodiment of the present invention;

DETAILED DESCRIPTION OF THE PREFERRED EMBODIMENTS

Now, the preferred embodiments of the present invention will be described with reference to the accompanying drawings.

[First Embodiment]

Figure 1:
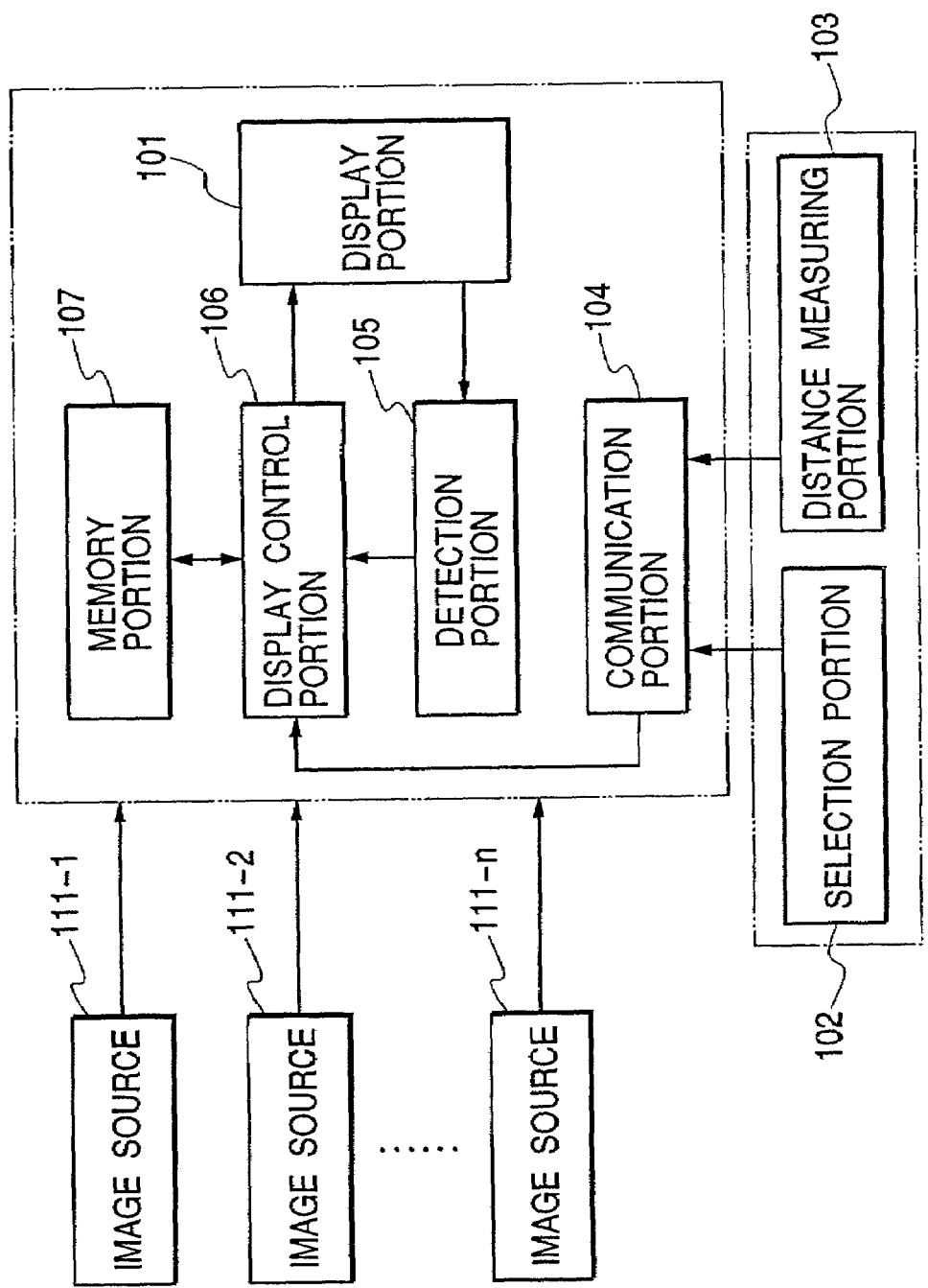
FIG. 1 is a block diagram showing a configuration of main members of a multiple image display system preferred as first and second embodiments of the present invention.

FIG. 1 is a functional block diagram showing a configuration of main members of multiple image display systems preferred as a first embodiment and a second embodiment to be described later of the present invention. The multiple image display system preferred as the first embodiment of the present invention is configured to comprise a display portion 101, a selection portion 102, a distance measuring portion 103, a communication portion 104, a detection portion 105, a display control portion 106 and a memory portion 107. In FIG. 1, reference numerals 111-1, 111-2, . . . 111-n represent image sources.

Describing functions of each of the members mentioned above, the display portion 101 displays images under control by the display control portion 106. The selection portion 102 selects areas at which images input from the image sources 111-1, 111-2, . . . 111-n are to be displayed. The distance measuring portion 103 measures absolute distances from the selection portion 102 to the selected images and is disposed in a multiple image display system in the second embodiment described later. The communication portion 104 transmits data selected by the selection portion 102 to a display system main unit. The detection portion 105 detects absolute locations of the selected areas on a screen of the display portion 101.

The display control portion 106 calculates a scaling magnification ratio for display data relative to input image data on the basis of horizontal resolution and a number of vertical lines of the input image data and detected display location data so that the input images are displayed in a size corresponding to the scaling magnification ratio (First Embodiment). Furthermore, the display control portion 106 calculates a scaling magnification ratio for display data relative to selected image data on the basis of a difference in a moving distance of the selection portion 102 which is measured by the distance measuring portion 103 and horizontal resolution and a number of vertical lines of the selected image data and utilizing a reference table showing relationship between the moving distance and the scaling magnification ratio so that the selected images are displayed in a size corresponding to the scaling magnification ratio (second embodiment). The memory portion 107 functions to store a layout frame which indicates a selected display range and is disposed separately from a memory portion which is used to store displayed data.

Figure 2:
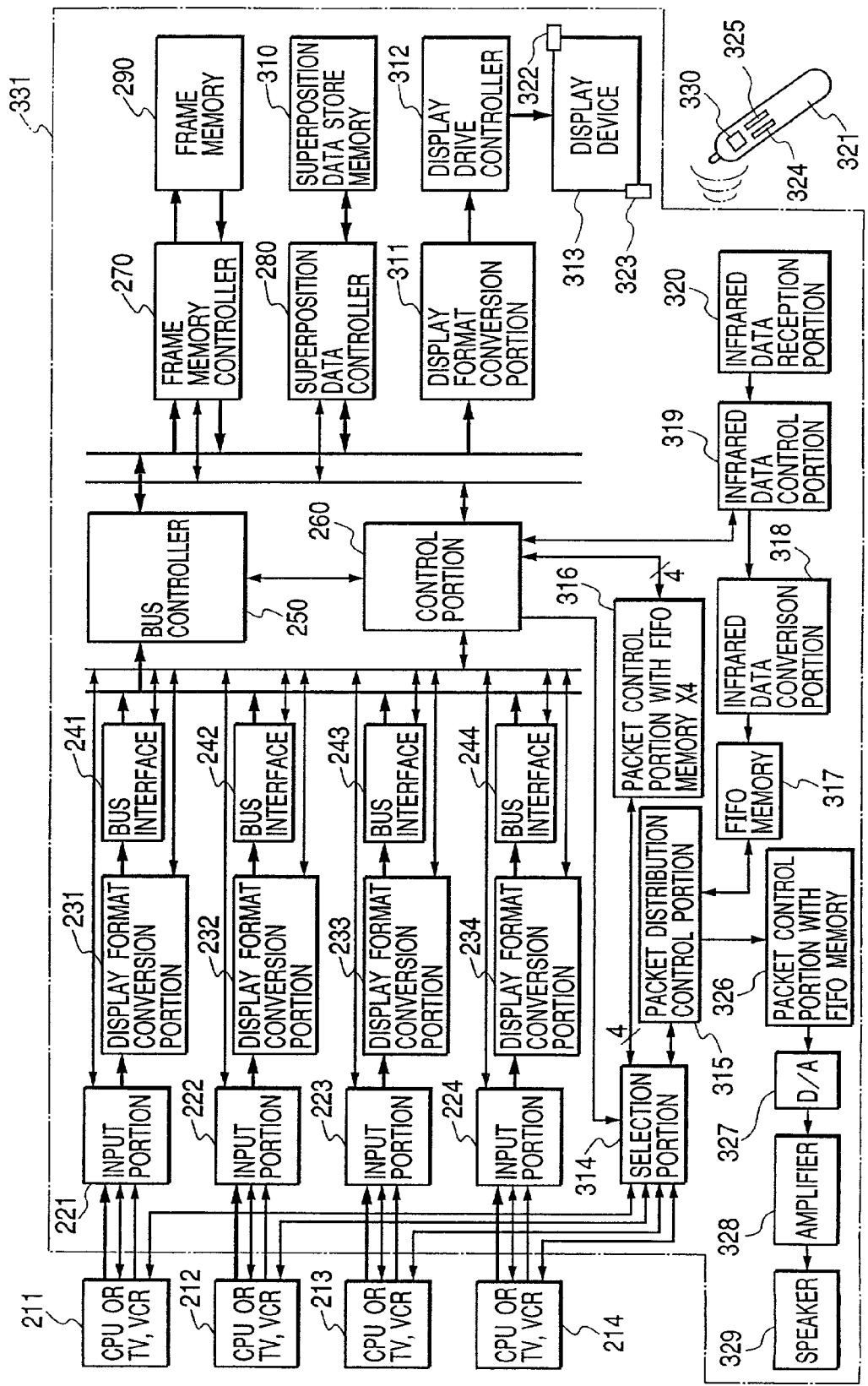
FIG. 2 is a block diagram showing a fundamental configuration of the multiple image display systems preferred as the first and second embodiments of the present invention.

The display portion (101) corresponds to a display device 313 shown in FIG. 2, and the selection portion (102) corresponds to a display pointer controller 321 shown in FIG. 2, and the distance measuring portion (103) corresponds to a distance measuring sensor 539 shown in FIG. 5N, and the communication portion (104) corresponds to an infrared light emission portion 330, a infrared data reception portion 320 and an infrared data control portion 319 shown in FIG. 2, and the detection portion (105) corresponds to an X axis (horizontal axis) infrared light repeater 322 and a Y axis (vertical axis) infrared light repeater 323 shown in FIG. 2, and the display control portion (106) corresponds to a control portion 260, superposition data controller 280, a display format conversion portion 311, and a display drive controller 312, and the memory portion (107) corresponds to a superposition data store memory 310 shown in FIG. 2.

Figure 8:
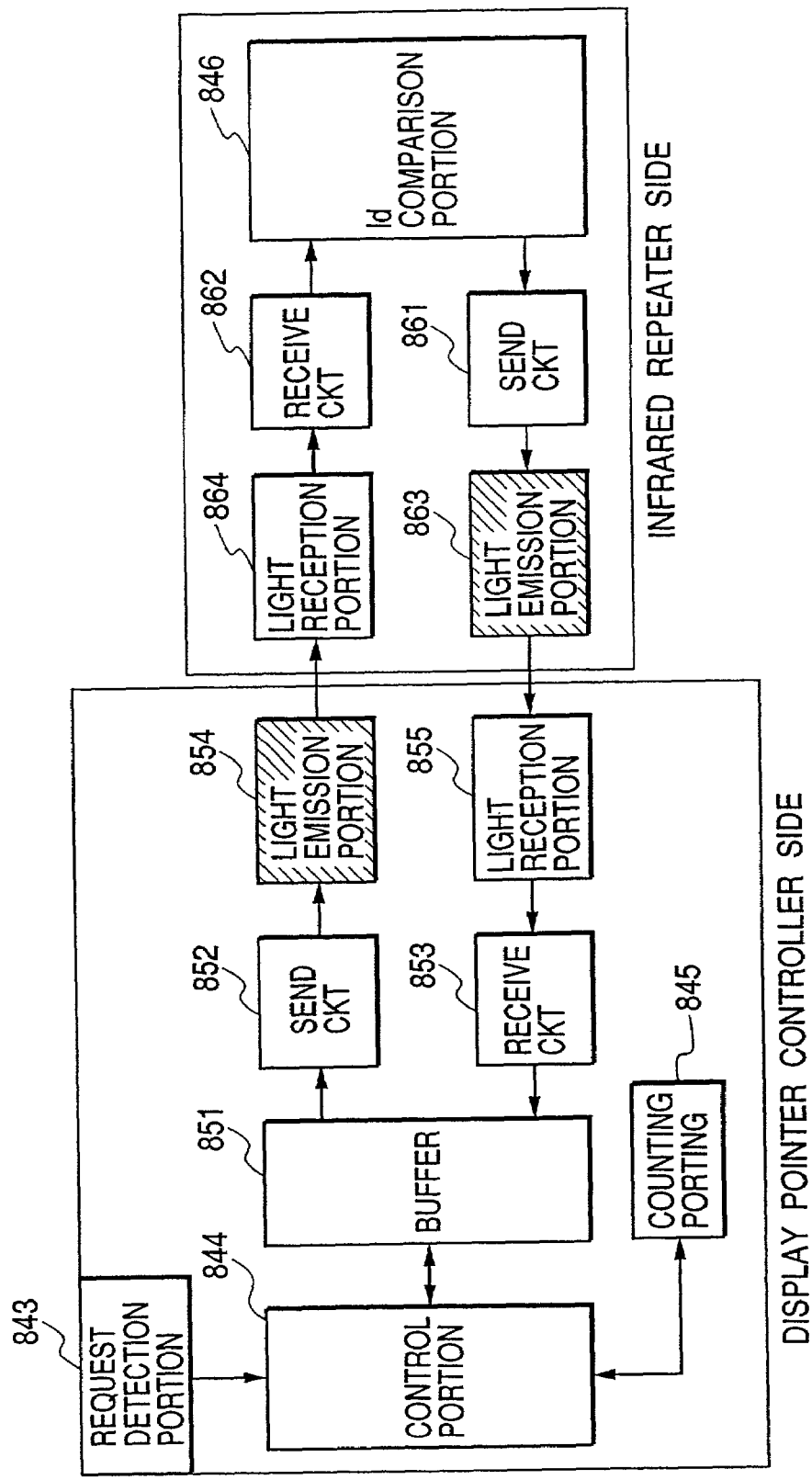
FIG. 8 is a block diagram showing a configuration of a distance measuring system using infrared rays in the first embodiment of the present invention.

Furthermore, the selection side transmission/reception portion of the selection portion (102) corresponds to a send circuit 852, a light emission portion 854, a receive circuit 853 and a light reception portion 855 shown in FIG. 8, and a count portion of the selection portion (102) corresponds to a counting portion 845 shown in FIG. 8, and a control portion of the selection portion (102) corresponds to a control portion corresponds to a control portion 844 shown in FIG. 8. Furthermore, the selection side transmission/reception portion of the detection portion (105) corresponds to a send circuit 861, a light emission portion 863, a receive circuit 862 and a light reception portion 864 shown in FIG. 8, and comparison portion of the detection portion (105) corresponds to an Id comparison portion 846 shown in FIG. 8.

FIG. 2 is a block diagram showing a fundamental configuration of the multiple image display system preferred as the first embodiment of the present invention. The multiple image display system preferred as the first embodiment of the present invention is configured to be capable of displaying four independent image sources, for example, on a single monitor, controlling input and output devices, for example, a mouth, a keyboard, a remote controller and a speaker of each image source in conjunction with image data displayed on the monitor, and mapping the four image sources at optimum areas on the monitor. The multiple image display system use image sources in a number larger or smaller than four.

A multiple image display system 331 preferred as the first embodiment of the present invention is configured to comprise input sections 221, 222, 223 and 224, display format conversion portions 231, 232, 233 and 234, bus interfaces 241, 242, 243 and 244, a bus controller 250, a control portion 260, a frame memory controller 270, a superposition data controller 280, a frame memory 290, a superposition data store memory 310, a display format conversion portion 311, a display drive controller 312, a display device 313, a selection portion 314, a packet distribution control portion 315, a packet control portion with FIFO memory 316, an FIFO memory 317, an infrared data conversion portion 318, an infrared data control portion 319, an infrared data reception portion 320, a display pointer controller 321, a packet control portion with FIFO memory 326, a D/A converter 327, an amplifier 328 and a speaker 329. In FIG. 2, reference numerals 211, 212, 213 and 214 represent image signal sources (hereinafter referred to as a group of image sources).

Describing configurations of the members mentioned above, the group of image sources 211, 212, 213 and 214 are configured, for example, as a personal computer, a work station, a digital TV and a video scope or the like. Four image sources are used in the multiple image display system. The input portions 221, 222, 223 and 224 receive image data output from the group of image sources 211, 212, 213 and 214 respectively. When the input portions 221, 222, 223 and 224 are to receive analog signals as the image data, each input portion is equipped with an A/D converter and a PPL (phase locked loop) for sampling the image data, when the input portions are to receive digital signals such as LVDS (Low Voltage Differential Signaling) as the image data, each input portion is equipped with a demodulator and a differential buffer for the image data or when the input portions are to receive composite signals from a TV and video scope as the image data, each input portion is equipped with an encoder which encodes the image data into R, G and B signals.

Each of the input portions 221, 222, 223 and 224 also receives control signals for receiving the image data from each of the image sources 211, 212, 213 and 214, for example, a horizontal synchronizing signal for synchronizing a line, a vertical synchronizing signal for synchronizing a frame or a field, a clock signal for sampling a picture element, a display enable signal indicating a transfer period for effective image data or the like simultaneously with the image data. Each of the input portions 221, 222, 223 and 224 receives the image data from the image sources 211, 212, 213 and 214 at independent timings. Furthermore, each of the input portions 221, 222, 223 and 224 has a function of serial communication with the group of image sources 211, 212, 213 and 214 as described later.

The display format conversion portions 231, 232, 233 and 234 convert display formats (numbers of display lines, dots and colors) of the image data received by the input portions 221, 222, 223 and 224 as controlled by the control portion 260. The bus interfaces 241, 242, 243 and 244 are used to input four independent image data sets into a common bus. The bus controller 250 mediates image data transfer on the basis of a priority order while receiving image data outputted from the bus interfaces 241, 242, 243 and 244, image data outputted from the frame memory controller 270 and the superposition data controller 280 and transfer demands from these members.

The control portion 260 controls the multiple image display system 331 as a whole, and has a RAM which has a calculating capability and temporarily stores CPU data, a ROM which stores a control program, a counter which counts time, a peripheral input/output interface and so on. Furthermore, the control portion 260 may be composed only of logical circuits. A control program may be built in the ROM or transferred from outside by way of the peripheral input/output interface. The frame memory controller 270 performs calculations to process and control image data inputted under mediation by the bus controller 250 into data matched with the frame memory 290. The frame memory controller 270 may be a CPU or a media processor which is capable of performing parallel calculations.

The superposition data controller 280 is used to display image data other than those in the input portions 221 through 224 in a superposed condition on the display device 313. The frame memory 290 is a memory which stores the image data to be traced on the display device 313 at least in an amount for a single frame. The superposition data store memory 310 is a memory which stores data to be superposed. The display format conversion portion 311 receives image data from a bus as controlled by the bus controller 250 and converts the image data into a format suited to the display drive controller 312. The display drive controller 312 drives the display device 313.

The display device 313 displays images. The display device 313 may, for example, a flat panel which has a matrix electrode structure (liquid crystal display or plasma display) or a CRT so far as it is capable of displaying images. The X axis (horizontal axis) infrared ray repeater 322 and the Y axis (vertical axis) infrared ray repeater 323 are disposed on the display device 313. The selection portion 314 switches high-speed serial data lines which are capable of sending and receiving data from the mouth (infrared rays), the keyboard, the speaker and so on which are input/output devices for the image sources 211 through 214 in multiplex packet conditions. Serial data lines according to IEEE 1394 (Standard specified by Institute of Electrical and Electronics Engineers) and USB (Universal Serial Bus: interface between peripheral devices having relatively low speeds and a computer) are known as examples of data lines which are capable of transferring such data in multiplex packet conditions.

The packet distribution control portion 315 distributes serial data selected by the selection portion 314 among packets. The packet control portion with FIFO memory 316 has a built-in FIFO (first in first out) memory which adjusts timing to receive packet data sent to the multiple image display system 331. The display pointer controller (pointing device) 321 mainly has a display location layout function, and has an infrared light emission portion 330, a display pointer settlement control button 324 and a display pointer cancellation control button 325. The infrared data reception portion 320 receives infrared data transmitted from the display pointer controller 321. The infrared data control portion 319 outputs a data format received by the infrared data reception portion 320 to the control portion 260 and the infrared data conversion portion 318.

The infrared data conversion portion 318 converts data sent from the infrared data control portion 319 into a packet of serial data. The FIFO memory 317 is a memory which adjusts a timing to transfer packet data created by the infrared data conversion portion 318 to the packet distribution control portion 315. The packet control portion with FIFO memory 326 has a built-in FIFO memory which adjusts a timing to receive sound packets sent from the group of image sources 211 through 214. The D/A converter 327 converts input digital sound data into analog sound data. The amplifier 328 amplifies the sound data. The speaker 329 is disposed in the multiple image display system 331 to provide a voice output.

FIG. 8 is a block diagram illustrating an electric configuration of a distance measuring system using infrared rays (the display pointer controller 321, X axis (horizontal axis) infrared ray repeater 322, and Y axis (vertical axis) infrared ray repeater 323) in the multiple image display system preferred as the first embodiment. The distance measuring system is equipped on a display pointer controller side with a request detection portion 843, a control portion 844, a counting portion 845, a buffer 851, a send circuit 852, a receive circuit 853, a light emission portion 854 and a light reception portion 855. Furthermore, the distance measuring system is equipped on an infrared ray repeater side with an Id comparison portion 846, a send circuit 861, a receive circuit 862, a light emission portion 863 and a light reception portion 864.

Describing functions of the members mentioned above in detail, the request detection portion 843 detects a request from the settlement control button 324 on the display pointer controller side. The control portion 844 performs issue of count start pulses and transfers and receives commands. The counting portion 845 counts the count start pulses. The buffer 851 accumulates sent/received data. The send circuit 852 performs transmission control by way of the light emission portion 854. The receive circuit 853 performs reception control by way of the light reception portion 855.

On the infrared ray repeater side, the Id comparison portion 846 performs Id (identification code) comparison. The send circuit 861 performs transmission control by way of the light emission portion 863. The receive circuit 862 performs reception control by way of the light reception portion 864.

Figure 11:
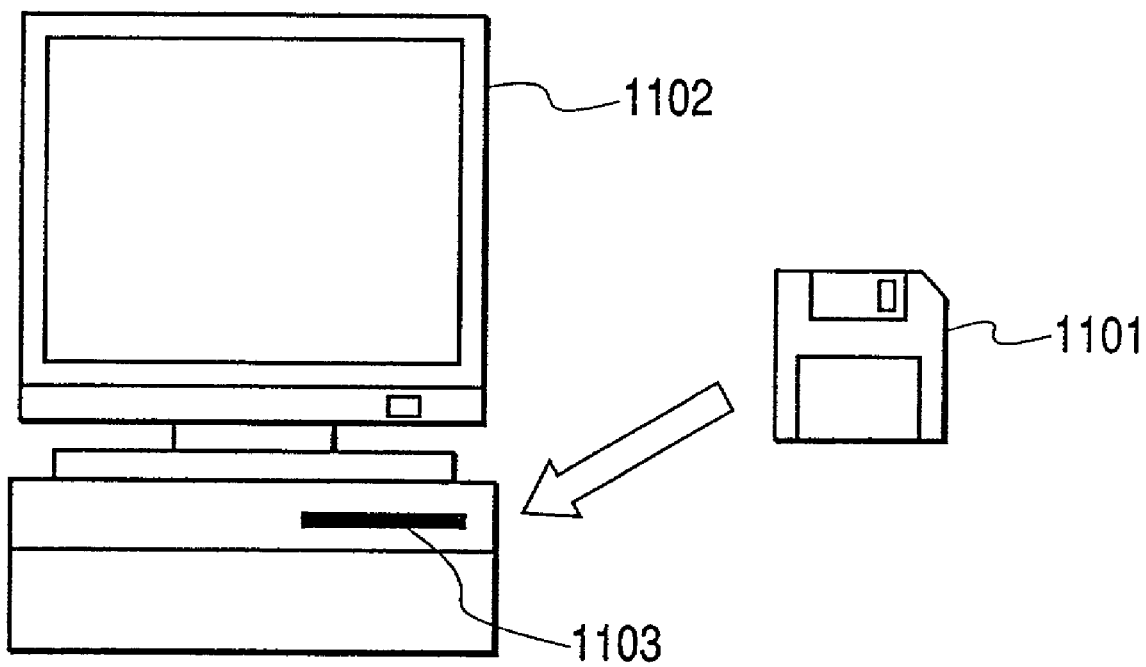
FIG. 11 is a descriptive diagram exemplifying a concept to supply a program according to the present invention and the data related thereto from a memory medium to a display system.

FIG. 11 is a descriptive diagram exemplifying a concept to supply a program according to the present invention and data related thereto from a memory medium to the display system. The program according to the present invention and data related thereto are supplied by inserting a memory medium 1101 such as a floppy disk or a CD-ROM into an insertion port 1103 for memory medium which is formed in a display system 1102. Then, the program can be executed by installing the program according to the present invention and data related thereto once on a hard disk from the memory medium 1101 and loading a RAM with the program and data from the hard disk or loading a RAM with the program and data directly from the memory medium 1101 without installing them on a hard disk.

Figure 10:
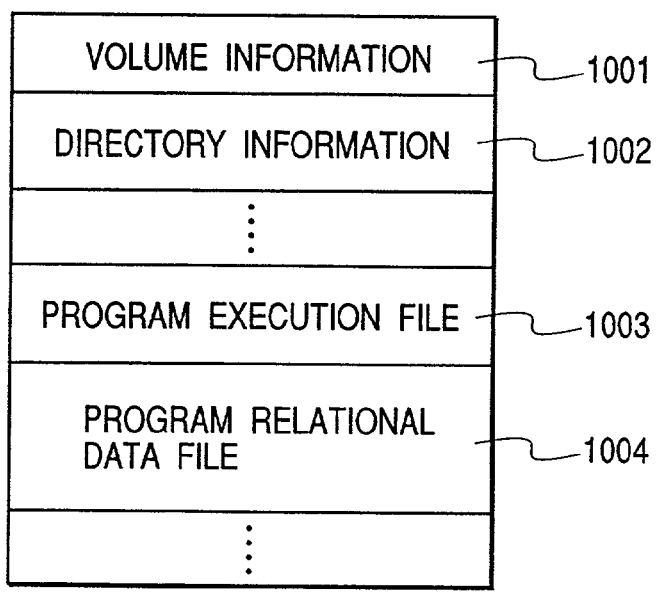
FIG. 10 is a descriptive diagram exemplifying a configuration of contents of a memory medium which stores a program according to the present invention and data related thereto.

FIG. 10 is a descriptive diagram exemplifying a configuration of contents of a memory medium which stores the program according to the present invention and data related thereto. The contents of the memory medium consist, for example, of volume information 1001, directory information 1002, a program execution file 1003, a program-related data file 1004 and so on. The program according to the present invention is coded on the basis of processings mentioned below which are to be executed by the multiple image display system.

(Description of Operations of the First Embodiment)

Now, description will be made of operations of the first embodiment of the present invention which is configured as explained above.

<Initialization of Display Location Layout>

After a power switch is turned on, the group of image sources 211 through 214 communicate with the multiple image display system 331 by way of two-way serial communication lines disposed through the input portions 221, 222, 233 and 224 of the multiple image display system 331. From the input portions 221 through 224, data such as a number of display dots, a number of display lines, a number of colors and a video output timing are sent to the group of image sources 211 through 214. The data is sent in a format according to a communication protocol which is preliminarily determined for both the sides.

The data format may, for example, be DDC (Display Data Channel) or EDID (Extended Display Identification Data) specified by VESA (Video Electronics Standards Association) in the U.S.A. Numbers of dots, lines and colors on the display device 313 are transferred in the format from the input portions. The data may be sent in a display format which is preliminarily determined by the control portion 260. On the basis of received data, the group of image sources 211, 212, 213 and 214 output image data and control signals therefor to the input portions 221, 222, 223 and 224 of the multiple image display system 331.

When the multiple image display system 331 is incapable of communicating with the group of image sources 211 through 214 by way of the two-way serial communication lines as described above (in case of analog video outputs), however, it is possible to know the data of the numbers of display dots and display lines by directly counting numbers of clock signals and horizontal synchronizing signals using the horizontal synchronizing signals and vertical synchronizing signals which are used by the input portions 221, 222, 223 and 224 for synchronizing a line and a frame or a field as well as the clock signals which are used for sampling a picture element. In any case, the multiple image display system 331 recognizes (or is capable of recognizing) at an initializing stage an image data display format (numbers of display lines, dots and colors) output from the group of image sources 211, 212, 213 and 214.

Furthermore, the input portions 221 through 224 always monitor at the initialization stage connection identification signals from the image sources 211 through 214 to judge how many image sources are connected to the multiple image display system 331. The connection identification codes are received as logical binary signals "1" or "2" from the group of image sources 211 through 214. When the connection cables are disconnected or the image sources are electrically deenergized, the connection cables terminate as resistors in the input portions 211 through 214 and the logic is set at "0," whereby the multiple image display system 331 is recognizing that image data is not input. This monitor data is sent to the control portion 260 at intervals of a certain period.

The control portion 260 detects the connection identification signal first from the input portion 221 and when the connection identification code is "1," the input portion 221 outputs received image data to the display format conversion portion 231, which performs display format conversion. When the connection identification signal is "0," on the other hand, the multiple control portion 260 detects the connection identification signal from the input portion 222 and scans the input portions 221 through 224 until a connection identification code "1" is detected. When all the connection identification codes are "0," the multiple image display system 331 is set in a power save mode, wherein all the members are electrically deenergized except the control portion 260, selection portion 314, packet distribution control portion 315, packet control portion with FIFO memory 316, FIFO memory 317, infrared data conversion portion 318, infrared data control portion 319 and infrared data reception portion 320.

<When an Image Source is Connected>

Description will be made below of a case wherein only the connection identification signal from the input portion 221 is "1." A user of the multiple image display system 331 starts operating the system by determining a location and a size on the display device 313 at which image data of the image source 211 is to be displayed. The location and size will be described with reference to FIGS. 3A to 3D. When no image source is connected to the multiple image display system 331 or no display location is determined for image sources connected to the multiple image display system 331, the display device 313 displays an image pattern which is determined arbitrarily by the system as shown in initial display condition of FIGS. 3A. This pattern can easily be displayed by allowing the frame memory controller 270 to trace an arbitrary image pattern in a image display area on the frame memory 290 under control by the control portion 260.

Then, description will be made of a method to lay out a display location with the X axis (horizontal axis) infrared ray repeater 322 and the Y axis (vertical axis) infrared ray repeater 323 disposed on the display device 313. This description constitutes a fundamental point of the present invention. The user touches a start point (X0, Y0) of the display device 313 with the display pointer controller 321 and determined the start point with the settlement control button 324. At this time, the display pointer controller 321 detects a request from the settlement control button 324 with the request detection portion 843 shown in FIG. 8 and sends the request to the control portion 844.

The control portion 844 issues a count start pulse to the counting portion 845 to allow it to start counting and transmits a command with Id exclusively for the X axis (horizontal axis) infrared ray repeater 322 so that only the X axis (horizontal axis) infrared ray repeater 322 responds. Though this command attains to both the X axis (horizontal axis) infrared repeater 322 and the Y axis (vertical axis) infrared ray repeater 323, only the X axis (horizontal axis) infrared ray repeater 322 which has an Id judged as coincident by the Id comparison portion 846 responds. At this time, the X axis (horizontal axis) infrared repeater 322 transmits the command repeatedly to the display pointer controller 321.

When the display pointer controller 321 detects reception of the command with the control portion 844, it issues a count start pulse to the counting portion 845 to terminate the counting and transmits a count value to the infrared data reception portion 320. Accordingly, the control portion 260 can obtain the count value. On the basis of the count value, the control portion 260 performs the following calculations.

$$\text{Count time} = \text{count value} \times (1/\text{count clock frequency}) \qquad (1)$$

Taking a preliminarily known propagation time other than an infrared ray propagation time as a propagation time in circuit, a distance between the display pointer controller 321 and a target infrared repeater is calculated on the basis of the equation (1) as:

$$\text{Measured distance} = \text{infrared ray propagation time} \times \\ (\text{count time} - \text{propagation time in circuit})/2 \qquad (2)$$

Figure 7:
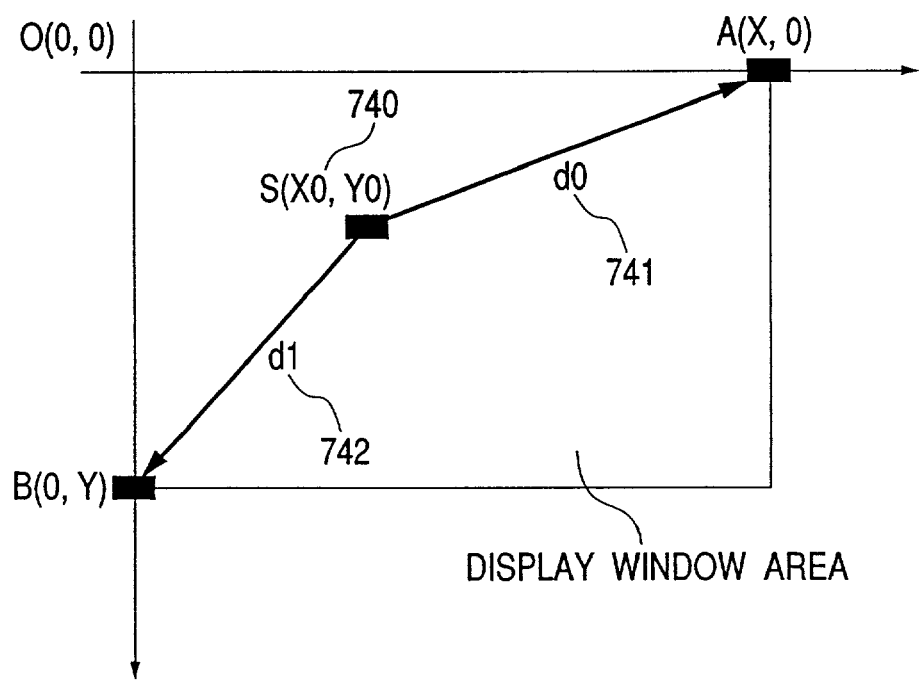
FIG. 7 is a descriptive diagram showing a two-dimensional distance measuring method in the first embodiment of the present invention.

Description will be made below of a concrete method to calculate the start point (X0, Y0) with reference to FIG. 7. In FIG. 7, a display window area is represented in terms of an X-Y coordinates system, a left upper corner is taken as an origin (0, 0), a right upper corner is taken as A (X, 0), a left lower corner is taken as B (0, Y) and a location pointed directly by the display pointer controller 321 on the display is taken as S (X0, Y0) (indicated by 740 in FIG. 7). When a distance from S to A is expressed by d0 indicated by 741 and a distance from S to B is expressed as d1 indicated by 742 in FIG. 7, d0 and d1 can be determined by the method described above. The control portion 260 performs the following calculations:

$$d0^2 = (X - X0)^2 + Y0^2 \qquad (3)$$

$$d1^2 = X0^2 + (Y0 - Y)^2 \qquad (4)$$

By subtracting the equation (4) from the equation (3), we obtain:

$$Y0 = (d0^2 - d1^2 + Y^2 - X^2)/2Y + (X/Y) \times X0 \qquad (5)$$

(X0, Y0) are serially determined by solving a quadratic equation of X0 under a condition of X0>0 using the equation (5) in the equation (3).

Then, the user touches a terminal point (X1, Y1) of the display device 313 similarly with the display pointer controller 321 and determines the terminal point with the settlement control button 324.

The series of works described above can be carried out using absolute locations on the screen of the display device 313 as shown in layout frame display preparing condition of FIG. 3B. Furthermore, the multiple image display system 331 always monitors locations of a display pointer from the start point to the terminal point and displays its locus as a layout frame such as that indicated by a reference numeral 332 shown in FIG. 3B to allow the user to perform the works through a convenient user interface. To prepare such an interface, moving locus data of the display pointer is used as X, Y data which compose packets to be glowed it intervals of a certain definite time to emit infrared rays. The infrared rays are received by the infrared data reception portion 320 and converted into electric signals. The infrared data control portion 319 sends the electric signals prepared as the packets from the infrared data reception potion 320 to the control portion 260. The control portion 260 extracts required X, Y data from the packet data and sends the data to the superposition data controller 280.

The superposition data controller 280 prepares data by plotting X and Y positions of the moving locus data of the display pointer under directions by the control portion 260 and writes the data into the superposition data store memory 310. Separately from the input image data (the image pattern arbitrarily determined by the system in the first embodiment), data read out of the superposition data store memory 310 which accumulates data to be displayed on the display device 313 is outputted to the bus by way of the superposition data controller 280 which operates under control by the control portion 260. The superposition data and the input image data output by way of the frame memory controller 270 (the image pattern arbitrarily determined by the system in the first embodiment) are selected and input by the display format conversion portion 311. A selection timing is set from the control portion 260.

The display format conversion portion 311 converts the data into data (data bus width, etc.) suited for input into the display drive controller 312. The display format conversion portion 311 outputs image data to the display drive controller 312. The display drive controller 312 generates drive signals which are used to drive the display device 313. When the display device 313 is a TFT (thin film transistor) liquid crystal cell, for example, the display drive controller 312 generates synchronizing signals per line, synchronizing signals per frame, image data shift clock signals, image data and alternating signals which are used to drive a driver IC in the display device. When the display device 313 is a CRT, the display drive controller 312 divides the image data into R, G, B, performs D/A conversion of each color, generates analog R, G, B signals, and outputs these signals together with horizontal and vertical synchronizing signals to the display device 313. The display drive controller 312 transfers wanted image data to the display device 313 for tracing an image on the display device 313.

When it is desired to cancel the works to input the location of the start point and the location of the terminal point, the works can be cancelled by depressing the cancellation control button 325 on the display pointer controller 321.

Upon completing the works described above, the display device 313 is set in layout frame display defined condition of FIG. 3C. The user confirms a location and a size of the layout frame, and when he desires to fit an input image into the layout frame, he determines the layout frame with the settlement control button 324 on the display pointer controller 321.

Then, description will be made of operations to fit the input image into the layout frame described above. On the basis of the start point (X0, Y0) and the terminal point (X1, Y1) determined by the layout frame preparing works described above, the control portion 260 calculates a display dot number Hdot (L) and a display line number Vline (L) in the layout frame by the following differential calculations:

$$\text{Hdot } (L) = X1 - X0$$

$$\text{Vline } (L) = Y1 - Y0$$

Since the control portion 260 knows a display dot number Hdot (I) and a display line number Vline (I) of an image input from the image source 211, it can calculate a magnification to scale the input image on the screen of the layout frame as follows:

Horizontal magnification ratio=Hdot (L)/Hdot (I)     (6)

Vertical magnification ratio=Vline (L)/Vline (I)     (7)

The input image is magnified on the screen when the scaling magnification is higher than 1, contracted on the screen when the scaling magnification is lower than 1 or displayed on the screen in an original size when the scaling magnification is 1. The scaling magnifications (6) and (7) are passed from the control portion 260 to the display format conversion portion 231. The input portion 221 outputs video signals to the display format conversion portion 231 in a desired format. When the scaling magnification (6)=1 and the scaling magnification (7)=1, the display format conversion portion 231 allows the image data to pass therethrough. When the scaling magnification (6)≠1 and the scaling magnification (7)≠1, the display format conversion portion 231 arbitrarily converts the image data at the scaling magnifications calculated above, thereby matching numbers of dots and lines of the input image with those in the layout frame. When an input number of colors to be displayed exceeds a number of colors which can be displayed by the display device 313, a number of bits of the image data is reduced by an intermediate processing such as dither method (a technique to manifest an intermediate gradation by combining white with black).

The image data output from the display format conversion portion 231 is stored into the frame memory 290 by way of the bus interface 241, bus controller 251 and frame memory controller 270. A location to store the data which is scaled at a stage to store the image data into the frame memory 290 is designated by passing the start point data (X0, Y0) from the control section 260 to the frame memory controller 270 so that an offset corresponding to an adequate start point (X0, Y0) is reserved at a stage to create a physical address to a frame memory in the frame memory controller 270. This frame memory is the frame memory 290 having a plurality of hierachys including ones which are used to store image data input by way of the bus controller 250 and controlled by the control portion 260.

The image data stored in the frame memory 290 is outputted to the bus at a certain timing controlled by the control portion 260 and provided to the display format conversion portion 311. At this stage, the bus controller 250 selects a hierachy from which the data is to be outputted under control by the control portion 260. By the internal processings described above, the display device 313 is set in the input display condition shown in FIG. 3D and ready for input within the obtained display frame.

<When Two or More Image Sources are Connected>

Then, description will be made of a case wherein two or more image sources are connected to the multiple image display system 331. Description will be made of an example wherein the image source 212 is connected to the display system when it displays image data of the image source 211 shown in FIG. 2. When the image data of the image source 211 is inputted, the input portion 221 detects the connection identification codes and sends the information to the control portion 260. When the control portion 260 recognizes presence of a new second image source, the user is allowed to perform a work to determine a layout frame for the next input using the display pointer controller 321. Description will be made below with reference to FIGS. 4E to 4I.

When the user determines a layout frame by designating a start point (X2, Y2) and a terminal point (X3, Y3) (points indicated by reference numerals 432 and 433 in (FIG. 4E) by the procedures described above so that the start point and the terminal point are not superposed on an image in an input area 1-1 in a layout frame display condition shown in FIG. 4E, an image input area 1-2 is displayed in an input display (JUST FIT) condition on the screen of the display device 313 at a scale optimum for a size of an input image as shown in FIG. 4G. When the user determined a layout frame as shown in FIG. 4F by designating a start point (X4, Y4) and a terminal point (X5, Y5) (points indicated by reference numerals 434 and 435 in FIG. 4F) by the procedures described above so that the points superpose on the image in the input area 1-1, however, the display device 313 may provide an input display condition shown in FIG. 4H or 4I. The input display condition shown in FIG. 4H exemplifies the case where the user desires to display a layout frame of an image in an input area 1-2 in a condition superposed as determined above. Though scaling can be made in procedures similar to those described above, it is necessary in this case to determine a priority order for superposition display. To determine the priority order, the user sets hierarchys of the frame memory 290 which are used to store the two image data sets for 1-1 and 1-2. The hierarchys of the frame memory 290 have priorities and when data is outputted from a plurality of hierarchys to a same location on the display device 313, data of a hierarchy having a high priority is outputted to the display format conversion portion 311 preferentially to that of a hierarchy having a low priority. At the stage to determine the layout frame, the user can optionally determine a priority order by designation with the display pointer controller 321.

The input display condition shown in FIG. 4I exemplifies a case where the user desires to designate only a size of a layout frame for the image in the input area 1-2 and prevent superposition display. Though scaling can be made in procedures which are similar to those described above, it is necessary in this case to obtain an additional imaginary display space. An imaginary display space can be obtained by allowing the control portion 260 to receive data of a volume of an actually mounted memory which is by the frame memory controller 270, and performing operational processing which determines by software or hardware an available imaginary display space from memory spaces used by the input areas 1-1 and 1-2 and mapping of the memory spaces used by the input areas 1-1 and 1-2 in the imaginary display space, thereby correcting the offset corresponding to a shift of the adequate start point at a stage where the control portion 260 creates the physical address to the frame memory in the frame controller 270.

In the first embodiment of the present invention, the multiple image display system 331 displays or informs a message indicated by a reference numeral 436 on the display device 313 as in the message output condition shown in FIG. 4J to ask the user whether he desires the input display condition which is shown in FIG. 4H or 4I when a display frame is laid out as in the layout frame display shown in FIG. 4F, or when the control portion 260 detects superpositions of the start point (X0, Y0) and the terminal point (X1, Y1) of the image in the input area 1-1 on the start point (X4, Y4) and the terminal point (X5, Y5) of the image in the input area 1-2 as:

$X0 < X4 < X1 < X5$ and $Y4 < Y0 < Y1 < Y5$

Such a message can be obtained by allowing the control portion 260 to emit a designation to the superposition data controller 280 to write output characters into the superposition data store memory 310 and make it function as an OSD (on screen display). Upon looking at this message, the user can optionally select either of the conditions shown in FIG. 4H or 4I with the display pointer controller 321. Though this message is obtained as display of the output characters from the data store memory 310 in the first embodiment described above, the message may be voice data which is created by the control portion 260 and provided from the speaker 290.

The multiple image display system preferred as the first embodiment of the present invention comprises the selection portion 102 which selects areas on the screen of the display portion 101 at which images input from the image sources are to be displayed, the communication portion 104 which transmits data selected by the selection portion 102 to the display system main unit, the detection portion 105 which detects absolute locations of the selected areas on the screen of the display portion 101, and the display control portion 106 which calculates a scaling magnification ratio for display data relative to input image data on the basis of data of horizontal resolution, a number of vertical lines and a display location of the input image data to display the input image at a scale corresponding to the scaling magnification ratio, the selection portion 102 comprises the send circuit 852 which performs transfers and receives infrared rays, the light emission portion 854, the receive circuit 853, the light reception portion 855, the counting portion 845 which counts an infrared ray propagation time from the selection portion to the detection portion which is a target, and the control portion 844 which issues data with Id (identification code) and an absolute location between the selection portion and the detection portion which is the target, and the detection portion 105 comprises the send circuit 861 which transfers and receives infrared rays, the light emission portion 863, the receive circuit 862, the light reception portion 864 and the Id comparison portion 846 which repeats reception data to the selection portion when Id codes sent from the selection portion are matched, and is disposed on each of the horizontal axis and the vertical axis of the screen of the display portion, whereby the multiple image display system provides functions and effects which are described below.

The multiple image display system is capable of determining a display layout with a pointing device (the selection portion 102) which designates a start point and a terminal point on a display device having a large screen. Speaking concretely, an internal control circuit (the control portion 106) is capable of automatically mapping images optimum in the layout area determined above when a location of the pointing device on a two-dimensional coordinates system is recognized and determined by operating the infrared ray repeater 322 on the X axis and the infrared ray repeater 323 (the detection portion 105) mounted on a display device which has a large screen in conjunction with an infrared ray port of a pointer, and informing the data to the multiple image display system.

Accordingly, the multiple image display system preferred as the first embodiment makes it possible to perform a layout work, at an initial stage of its use, while recognizing absolute locations on the display device having a screen for multiple image inputs without tedious display driver settings which was conventionally impossible. Therefore, the multiple image display system provides an effect to provide a smooth and comfortable environment for presentation or conferences using a plurality of image sources.

[Second Embodiment]

Now, description will be made of a second embodiment of the present invention, wherein the layout frames for the image sources laid out and displayed in the first embodiment are varied after the determination. The variation is classified into two types: expanding variation and contraction variation.

A multiple image display system 331 preferred as the second embodiment of the present invention is configured to comprise a display portion 101, a selection portion 102, a distance measuring portion 103 a communication portion 104, a detection portion 105, a display control portion 106 and a memory portion 107 (see FIG. 1). Reference numerals 111-1, 111-2, . . . 111-n in FIG. 1 represent image sources.

Furthermore, the multiple image display system 331 preferred as the second embodiment of the present invention is configured to comprise input sections 221, 222, 223 and 224, display format conversion portions 231, 232, 233 and 234, bus interfaces 241, 242, 243 and 244, a bus controller 250, a control portion 260, a frame memory controller 270, a superposition data controller 280, frame memory 290, a superposition data store memory 310, a display format conversion portion 311, a display drive controller 312, a display device 313, a selection portion 314, a packet distribution control portion 315, a packet control portion with FIFO memory 316, an FIFO memory 317, an infrared data conversion portion 318, an infrared data control portion 319, an infrared data reception portion 320, a display pointer controller 321, a packet control portion with FIFO memory 326, a D/A converter 327, an amplifier 328 and a speaker 329 (see FIG. 2). Reference numerals 211, 212, 213 and 214 in FIG. 2 represent sources of image signals.

Figure 6:
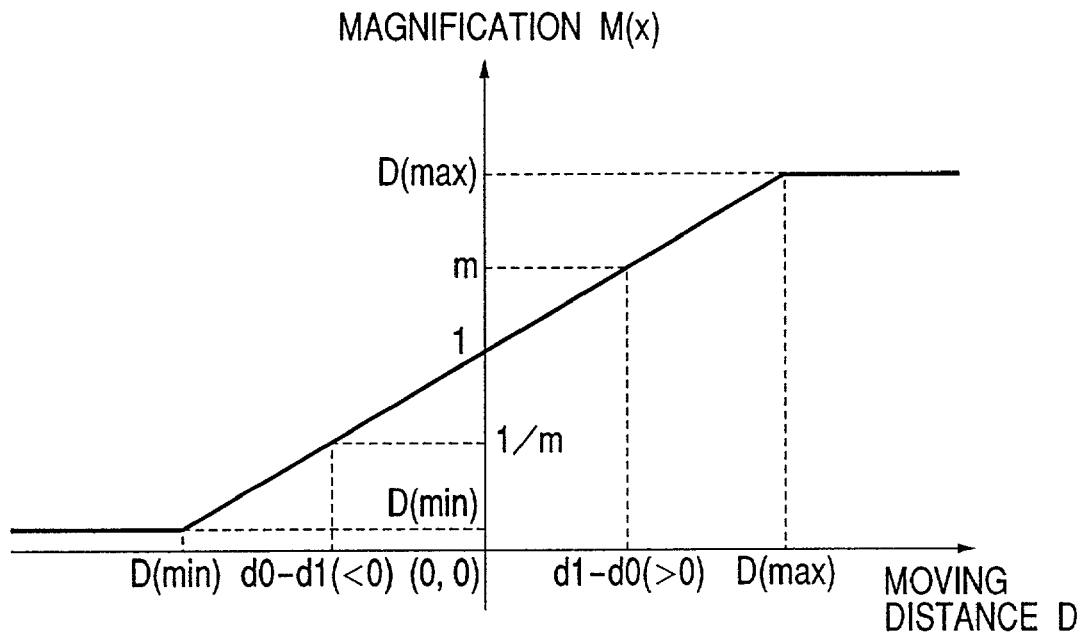
FIG. 6 is a descriptive diagram showing a graph of a reference table of moving distance versus magnification in the second embodiment of the present invention.

Details of FIG. 1 and FIG. 2 will not be described in particular since the multiple image display system preferred as the second embodiment of the present invention is similar to the multiple image display system preferred as the first embodiment described above, except for an origin infrared ray repeater 539 which is mounted on the display device 313 in addition to the X axis (horizontal axis) infrared ray repeater 322 and the Y axis (vertical axis) infrared ray repeater 323 (see FIG. 5N), and the control portion 260 which has a reference table of moving distance versus magnification ratio (see FIG. 6).

<When an Image Source is to be Selectively Expanded>

With reference to FIGS. 5K to 5N, description will be made of an example where an input image is expanded after a layout frame is displayed. To expand an image displayed in the input area 1-2 in an initial display condition shown in FIG. 5K, the user must first select the image displayed in the input area 1-2 (an active condition). This image can be selected by allowing a display control cursor in a display window area and selecting the active condition with the cursor located within the window area.

Figure 9:
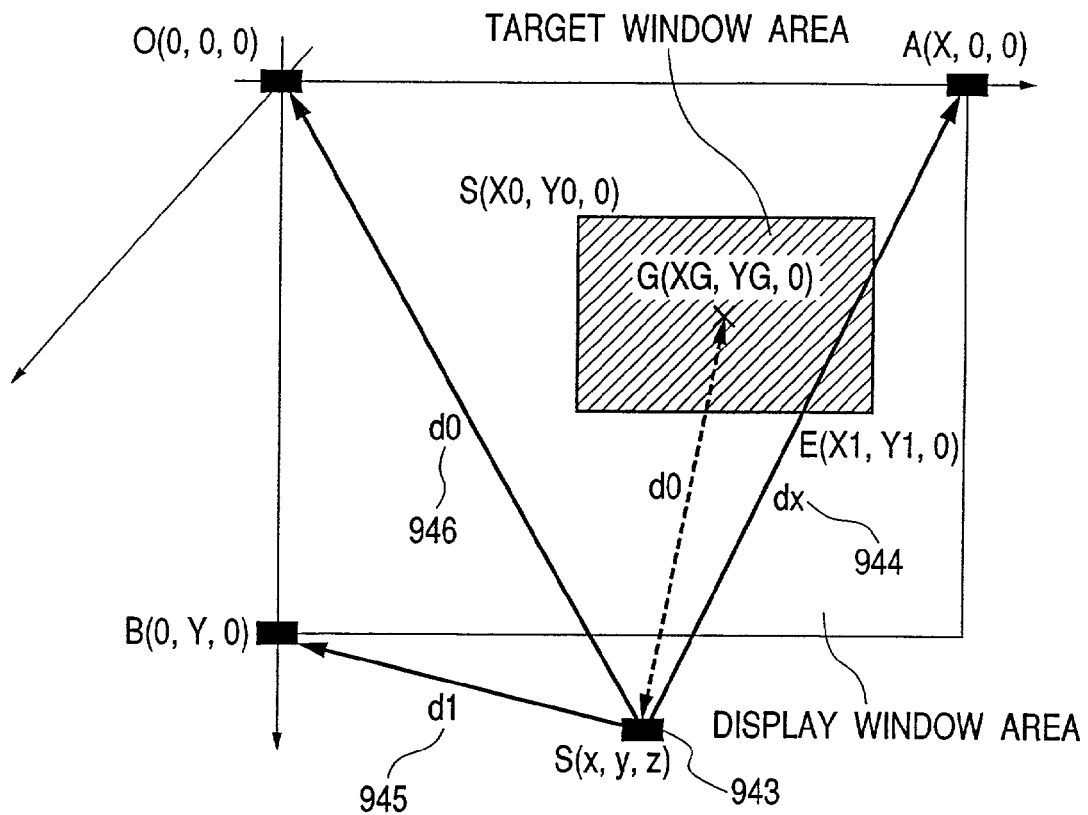
FIG. 9 is a descriptive diagram showing a three-dimensional distance measuring method in the second embodiment of the present invention.

To expand the selected image displayed in the input area 1-2, the user measures a distance d0 from the display pointer controller 321 to the display device 313 by depressing the settlement control button 324. Description will be made of a concrete distance measuring method with reference to FIG. 9. In FIG. 9, the display window area is expressed in terms of a three-dimensional XYZ coordinates system, a left upper corner of the display device is taken as an origin (0, 0, 0), a right upper corner of the display device is taken as A (X, 0, 0), a left lower corner of the display device is taken as B (0, Y, 0), a location of the display pointer controller 321 to emit a command is taken as S (x, y, z) indicated by a reference numeral 943 in FIG. 9 and a location of a gravitational center of an actively selected window is taken as G (XG, YG, 0).

When a distance from S to A is represented by dx which is indicated by a reference numeral 944 in FIG. 9, a distance from S to B is designated by dy which is indicated by a reference numeral 945 in FIG. 9 and a distance from S to O is denoted by do indicated by a reference numeral 946 in FIG. 9, the distances dx, dy and do can be measured by the method described above. The control portion 260 performs the following calculations:

$$dx^2 = (X-x)^2 + y^2 + z^2 \quad (8)$$

$$dy^2 = x^2 + (Y-y)^2 + z^2 \quad (9)$$

$$do^2 = x^2 + y^2 + z^2 \quad (10)$$

By subtracting the equation (10) from the equation (8), we obtain:

$$x = (do^2 - dx^2 + X^2)/2X \quad (11)$$

By subtracting the equation (10) from the equation (9), we obtain:

$$y = (do^2 - dy^2 + Y^2)/2Y \quad (12)$$

By using the equations (11) and (12) in the equation (10), we obtain:

$$z = [dO^2 - \{do^2 - dy^2 + Y^2\}/2Y]^2 - \{(do^2 - dx^2 + dx^2)/2X\}^2]^{1/2} \quad (13)$$

Accordingly, the control portion 260 allows to determine S (x, y, z) indicated by the reference numeral 943 in FIG. 9. Furthermore, it is possible to determine:

$$XG = (X0 + X1)/2 \quad (14)$$

$$YG = (Y0 + Y1)/2 \quad (15)$$

$$d0 = \{(x - XG)^2 + (y - YG)^2 + z^2\}^{1/2} \quad (16)$$

Accordingly, it is possible to determine the distance do from the display pointer controller 321 to the target window accurately and easily by using the constant values in the equations (11) through (15). This method is characterized in that the distance measuring method requires no tedious procedure of the user such as the designation of a focus condition for a range finding by a camera.

Then, description will be made of an image expanding method. To expand the image displayed in the input area 1-2, the user pulls the display pointer controller 321 in a direction of an expansion stroke indicated by a reference numeral 537 in FIG. 5N while depressing the settlement control button 324 on the display pointer controller 321 at the initial distance measuring step. While the display pointer controller 321 is moved, a distance d1 from the display pointer controller 321 to the display device 313 is measured by the method described above and finally determined when the user releases the settlement control button 324. To make the user interface convenient for this work, the display system always monitors locations of the display pointer between the start point and the terminal point even during the expansion stroke and displays its locus as a layout frame such as that indicated by a reference numeral 332 in a layout frame display condition shown in FIG. 5L.

With reference to FIG. 6, description will be made of how a size of a final expanded layout frame is determined from the layout frame described above on the basis of the measured distance d1. An infrared transmission portion (the infrared ray emission portion 330) passes the measured distances d0 and d1 from the display pointer controller 321 to the control portion 260. On the basis of this data, the control portion 260 calculates a moving distance d1−d0. In the second embodiment, the moving distance is positive or d1−d0>0. Since an expanding magnification is to be determined on the basis of this result, the control portion 260 preliminarily has a reference table such as that shown in FIG. 6. This table has an abscissa and an ordinate which correspond to a moving distance D and a magnification M so that the magnification is 1× when the moving distance is 0 and the magnification is enhanced to levels higher than 1× as the moving distance is prolonged in a positive direction.

The magnification is fixed at a maximum level M(max) at a certain limit D(max) of the moving distance and cannot be further enhanced. The maximum magnification M(max) is adequately settable in conjunction with a location of an image input into a peripheral input area (1-1 in the second embodiment) when an image is to be just fit as shown in FIG. 4G, in conjunction with display areas when an image is to be displayed in a superposed condition as shown in FIG. 4H or in conjunction with an address map in the frame memory 290 when an imaginary space is to be displayed as shown in FIG. 4I. When the moving distance is varied in a negative direction, the magnification is varied correspondingly within a negative region. The magnification is fixed at a minimum level M(min) at a certain limit D(min) of the moving distance and cannot be lower than this level. The minimum magnification level is determined dependently on a minimum scaling magnification of the display format conversion portions 231 through 234.

The layout frame in the input area 1-2 at the moving distance d1−d0 is expanded m times as large according to the reference table described above. In an example where a center of expansion lies at (X1, Y0) as shown in FIG. 5N, the start point remains unchanged from (X1, Y0) before the expansion, the terminal point is calculated as ((1−m)X1+ mX0, mY1+(1−m)Y0) and the layout frame is displayed in an expanded condition as shown in FIG. 5M while tracing a locus of the layout frame as shown in FIG. 5L.

<When an Image Source is to be Selectively Contracted>

With reference to FIGS. 5K to 5N, description will be made of an example to contract an input image after a layout frame is displayed. Contracting procedures are similar to the expanding procedures described above. To contract an image displayed in the input area 1-2 which is laid out as in the initial display condition (expansion display condition) shown in FIG. 5M, the user must first select the image input into the input area 1-2 (active condition). Several selecting procedures may be considered but will not be described in particular since the procedures do not constitute a key point of the present invention. To contract the image selected in the input area 1-2, the user measures a distance d1 from the display pointer controller 321 to the display device 313 by depressing the settlement control button 324.

Then, description will be made of a contracting procedures. To contract the image selected in the input area 1-2, the user pushes the display pointer controller 321 toward the display device 313 in a direction of a reduction stroke represented by a reference numeral 538 in FIG. 5N while depressing the settlement control button 324 on the display pointer controller 321 at the initial distance measuring step. A distance d0 from the display pointer controller 321 to the display device 313 is measured while the display pointer controller is moved and the distance d0 is finally determined upon release of the settlement control button 324 by the user.

To make the user interface convenient for the contracting work, the display system always monitors locations of the display pointer from the start point to the terminal point and displays its locus as a layout frame such as that represented by a reference numeral 332 in FIG. 5N in a condition such as that shown in FIG. 5L.

Then, with reference to FIG. 6, description will be made of how a size of a finally contracted layout frame is determined from the layout frame described above on the basis of the measured distance d0. The infrared ray transmission portion (infrared ray emission portion 330) passes the measured distances d0 and d1 from the display pointer controller 321 shown in FIG. 2 to the control portion 260. On the basis of this data, the control portion 260 calculates a moving distance d0−d1. In this example of contraction, the moving distance is negative S, or d0−d1<0. In order to determine a contracting ratio on the basis of this result, the display system uses the reference table shown in FIG. 6 as in the case of the expansion.

According to the reference table mentioned above, the layout frame for the image in the input area 1-2 at the moving distance d0−d1 is contracted at a ratio of 1/m, and in an example where a contracting center lies at (X1', Y0') as shown in FIG. 5N, the start point remains unchanged or lies at (X1', Y0'), a terminal point is calculated as ((1−1/m)X1'+1/mX0', 1/mY1'+(1−1/m)Y0') and a contracted condition is finally displayed as shown in FIG. 5K while a locus of a layout frame is being traced as shown in FIG. 5L.

The multiple image display system preferred as the second embodiment of the present invention comprises the selection portion 102 which selects one of image data displayed on the display portion 101, the distance measuring portion 103 which measures an absolute distance from the selection portion 102 to a selected image, the communication portion 104 which transmits distance data measured by the distance measuring portion 103 to the display system main unit, and the display control portion 106 which calculates a scaling magnification for display data relative to the selected image data on the basis of a difference of a moving distance of the selection portion 102 measured by the distance measuring portion 103, horizontal resolution and a number of vertical lines of the selected image data utilizing the reference table representing relationship between the moving distance and the scaling magnification to allow the selected image to be displayed at a scale corresponding to the scaling magnification, the detection portions 105 (the X axis (horizontal axis) infrared ray repeater 322, Y axis (vertical axis) infrared ray repeater 323 and origin infrared ray repeater 539) is disposed at different three points on the display portion 101, and the distance measuring portion 103 measures the absolute distance from the selection portion to the selected display image by calculating three distances to the detection portions as described above, whereby the multiple image display system preferred as the second embodiment of the present invention provides functions and effects which are described below.

Since the origin infrared ray repeater 539 (the detection portion 105) is additionally disposed on the display portion 101 so that a presentator produces a variation of a distance from a target image source to a pointing device gripped by the presentator for a demand to scale an image source in use of the display system by a stroke action or cooperation of the origin infrared ray repeater and an infrared ray port of the pointing device gripped by the presentator, the multiple image display system is capable of expanding and contracting the image source to an adequate size while referring to the distance variation data with an internal control circuit (the display control portion 106).

Accordingly, the multiple image display system preferred as the second embodiment of the present invention has a capability to meet an urgent demand for expansion or contraction of an image during presentation only with a stroke action of a display pointer for presentation by a presentator, which is conventionally unavailable. Accordingly, the multiple image display system provides users with an effect to provide smooth and comfortable operating environments for presentation or conferences using a plurality of image sources.

The present invention is applicable to a system which is composed of plural or single apparatus. It is needless to say that the object of the present invention can be accomplished by equipping a system or an apparatus with a memory medium (storage medium) which stores program codes of a software having the functions of the embodiment described above and executing the program by allowing a computer (a CPU or an MPU) of the system of the apparatus to read out the program codes from the memory medium.

In such a case, the program codes read out of the memory medium serve by themselves as the functions of the embodiment and the memory medium proper constitutes the present invention.

Usable as a memory medium for providing the program codes is, for example, a floppy disk, a hard disk, an optical disk, a photomagnetic disk, a CD-ROM, a CD-R, a magnetic tape, a non-volatile memory card or a ROM.

Furthermore, it is needless to say that the present invention has a scope which includes not only the functions of the embodiments described above which are obtained by executing the program codes read out by a computer but also the functions of the embodiments described above which are obtained with actual processings partially or totally performed by OS or the like operating in a computer on the basis of instructions by program codes.

Furthermore, it is needless to say that the present invention has a scope including the functions of the embodiments described above which are obtained by actual processings partially or totally performed by a CPU or the like installed on a function expansion board or unit on the basis of instructions by program codes which are read out of a memory medium and written into a memory used in the function expansion board incorporated into a computer or function expansion unit connected to a computer.

The multiple image display system according to the present invention which selects an area on a screen of a display portion at which an input image is to be displayed, detects a location of the selected area on the screen, performs scaling control to display the input image in a predetermined size on the basis of the input image data and a detected display location data and detects locations of a selection portion and a target detection portion as described above by counting the infrared ray propagation time between them makes it possible to perform a layout work while recognizing a location on a display portion having a multiple input image screens at an initial stage of use without tedious display driver settings which is conventionally impossible, thereby providing users with an effect to provide smooth and comfortable operating environments for presentation or conferences using a plurality of image sources.

Furthermore, the multiple image display system according to the present invention which selects a desired image out of a plurality of images displayed on display portions, measures a distance from a selection portion to the selected image, performs a scaling control to display the selected image in a predetermined size on the basis of the distance measurement and controls the measurement of the distance from the selection portion to the selected image by calculating distances to detection portions disposed at three different points on a display portion has a capability to meet an urgent demand for expansion or contraction of an image during presentation only with a stroke action of a presentation selection portion (display pointer) by a presenter which is conventionally impossible, thereby exhibiting an effect to provide users with smooth and comfortable environments for presentation or conferences using a plurality of image sources.

What is claimed is:

1. A display system capable of displaying on a display screen of display means a plurality of images input from image sources, comprising:
   input means which inputs position information of the images on the display screen;
   selection means which selects one of a plurality of images displayed on the display screen by designating a display area;
   confirmation selection means which allows an operator to select a display layout among a superposition layout and an imaginary display space layout with displaying a message for selection of the layout on the display screen; and
   display control means which calculates a scaling magnification for the selected image on the basis of the position information, and displays the selected image in a size corresponding to the scaling magnification and a non-selected image, in the selected display layout.

2. The display system according to claim 1, further comprising communication means which transmits data input by said input means to a display system main unit, wherein said display control means calculates a scaling magnification for display data relative to input image data on the basis of horizontal resolution and a number of vertical lines of the input image data and said detected display location data so that the input images are displayed on scales corresponding to the scaling magnification.

3. The display system according to claim 1, further comprising measuring means for measuring the position information, wherein said input means comprises selection side transmission/reception means which transmits and receives infrared rays, counting means which counts an infrared ray propagation time between said input means and said measuring means which is a target, and control means which issues data with identification codes and detects the location of said input means and said target measurement means, and wherein said measuring means comprises detection side transmission/reception means which transmits and receives infrared rays and comparison means which repeats reception data to said selection means when the identification codes transmitted from said input means are coincident, and is disposed on a horizontal axis and a vertical axis of the screen.

4. The display system according to claim 1, wherein said input means is capable of designating a point and another point on a diagonal of a rectangular frame as a start point and a terminal point of a display selection range on the screen.

5. The display system according to claim 1, further comprising memory means which stores a layout frame indicating a display selection range, wherein said display control means displays display screen data and layout frame data in a superposed condition on the screen.

6. The display system according to claim 1, wherein said confirmation selection means is voice data input/output means.

7. The display system according to claim 1, wherein said display control means displaces a display location without changing size of a display selection range when the display selection range is superposed on a display area for another input image already displayed.

8. The display system according to claim 7, wherein said display control means allows an imaginary space to be displayed when a boundary of a frame memory for a display screen is exceeded in displacement of said display location.

9. The display system according to claim 1, wherein the image sources include at least one of computers, work stations, digital TVs and video scopes.

10. A display system capable of displaying images on a display screen of display means, comprising:
    input means in space in front of said display means, which inputs position information of the images on the display screen, and which includes determining means which determines a moving distance of said input means;
    measuring means which measures a distance between a position in space of said input means and a target window displayed on the screen of the display means;
    selection means which selects one of a plurality of images displayed on the display screen; and
    display control means which calculates a scaling magnification for the selected image on the basis of the moving distance derived from an output of said measuring means, and displays the layout frame of the target window for the selected image with a locus of tracing the scaling magnification and the selected image in a size corresponding to a scaling magnification on the basis of the determined moving distance.

11. The display system according to claim 10, wherein said display control means calculates the scaling magnification on the basis of a reference table representing a relationship between the moving distance and the scaling magnification.

12. The display system according to claim 10, comprising:
    detection side transmission/reception means which transmits and receives infrared rays;
    comparison means which repeats reception data to said input means when identification codes returned from said input means are coincident; and
    detection means which are disposed at least at three different points on the display means, wherein said measuring means measures a distance from said input means to the input image by calculating distances to said detection means.

13. An image display method applicable to a display system capable of displaying on a display screen of display means a plurality of images input from image sources, comprising:
    an input step to allow input means to input position information of the images on the display screen;
    a selecting step to allow selection means to select one of a plurality of images displayed on the display screen by designating a display area;
    a confirmation selection step of providing confirmation selection means to allow an operator to select a display layout among a superposition layout and an imaginary display space layout with displaying a message for selection of the layout on the display screen; and
    a display control step to allow display control means to calculate a scaling magnification for the selected image on the basis of the position information, and to display the selected image in a size corresponding to the scaling magnification and a non-selected image, in the selected display layout.

14. The image display method according to claim 13, further comprising a communication step to transmit selection data obtained at said input step to a display system main unit, wherein a scaling magnification for display data relative to input image data is calculated at said display control step on the basis of horizontal resolution and a number of vertical lines of the input image data and the detected display location data so that the input images are scaled and displayed in a size corresponding to the scaling magnification.

15. The image display method according to claim 13, further comprising a measuring step to allow measuring means to measure the position information, wherein said input step comprises a selection side transmission/reception step to transmit and receive infrared rays, a counting step to count an infrared ray propagation time between the input means and the measuring means which is a target, and a control step to issue data with identification codes and detect locations of the input means and the target measuring means, and said detection step comprises a detection side transmission/reception step to transmit and receive infrared rays, a comparison step to repeat reception data to said input step when the identification codes transmitted from said input step are coincident, and wherein the measurement means used at said measurement step is disposed on a horizontal axis and a vertical axis of the screen of the display.

16. The image display method according to claim 13, wherein a point and another point on a diagonal of a rectangular frame can be designated as a start point and a terminal point of a display selection range on the screen at said input step.

17. The image display method according to claim 13, further comprising a memory step to store a layout frame indicating the display selection range, wherein display screen data and layout frame data are displayed in a superposed condition on the screen at said display control step.

18. The image display method according to claim 13, wherein said confirmation and selection are performed using voice data input/output means at said confirmation selection step.

19. The image display method according to claim 13, wherein the display location is displaced without changing a size of the display selection range at said display control step when the display selection area superposes on a display area of another input image already displayed.

20. The image display method according to claim 19, wherein an imaginary space is displayed at said display control step when a boundary of a frame memory for the display screen is exceeded in displacement of the display location.

21. The image display method according to claim 13, wherein the image sources include at least one of a computer, a work station, a digital TV and a video scope.

22. An image display method capable of displaying images on a display screen of display means, comprising:
  an input step to allow input means in space in front of the display means to input position information of the images on the display screen and to allow determining means to determine a moving distance of the input means;
  a measuring step to measure a distance between a position in space of the input means and a target window displayed on the screen of the display means;
  a selecting step to select one of a plurality of images displayed on the display screen; and
  a display control step to allow display control means to calculate a scaling magnification for the selected image on the basis of the moving distance from an output of said measuring means, and to display the layout frame of the target window for the selected image with a locus of tracing the scaling magnification and the selected image in a size corresponding to a scaling magnification on the basis of the determined moving distance.

23. The image display method according to claim 22, wherein the scaling magnification is calculated at said display control step on the basis of a reference table representing a relationship between the moving distance and the scaling magnification.

24. The image display method according to claim 22, further comprising:
  a detection side transmission/receiving step to transmit and receive infrared rays; and
  a detection step having a comparison step to repeat reception data to said input step when identification codes transmitted from said input step are coincident, wherein detection means is used at said detection step and is disposed at least at three different points on the display means, and distances from the input means to the input images are measured at said distance measuring step by calculating a distance to each of the detection means.

25. A storage medium storing a program to execute an image display method applicable to a display system capable of displaying on a display screen of display means a plurality of images inputted from image sources and legible by a computer, wherein said image display method comprises:
  an input step to input position information of the images on the display screen with input means;
  a selecting step to allow selection means to select one of a plurality of images displayed on the display screen by designating a display area;
  a confirmation selection step of providing confirmation selection means to allow an operator to select a display layout among a superposition layout and an imaginary display space layout with displaying a message for selection of the layout on the display screen; and
  a display control step to allow display control means to calculate a scaling magnification for the selected image on the basis of the position information, and to display the selected image in a size corresponding to the scaling magnification and a non-selected image, in the selected display layout.

26. The storage medium according to claim 25, wherein said image display step further comprises a measuring step to allow measuring means to measure the position information, and wherein said input step comprises a selection side transmission/reception step to transmit and receive infrared rays, a counting step to count an infrared ray propagation time between the input means and the measuring means which are targets, and a control step to issue data with identification codes and detect locations of the input means and the target measuring means, and said measuring step comprises a detection side transmission/reception step to transmit and receive infrared rays and a comparison step to repeat reception data to said input step when the identification codes transmitted from said input step are coincident, and the measuring means used at said measuring step is disposed on a horizontal axis and a vertical axis of the screen of the display.

27. A storage medium storing a program to execute an image display method applicable to a display system capable of displaying images on a display screen of display means, wherein said image display method comprises:

an input step to allow input means in space in front of the display means to input position information of the images on the display screen and to allow determining means to determine a moving distance of the input means;

a measuring step to measure the distances between a position in space of the input means and a target window displayed on the screen of the display means;

a selecting step to select one of a plurality of images displayed on the display screen; and a display control step to allow display control means to calculate a scaling magnification for the selected image on the basis of the moving distance derived from an output of said measuring means, and to display the layout frame of the target window for the selected image with a locus of tracing the scaling magnification and the selected image in a size corresponding to a scaling magnification on the basis of the determined moving distance.

28. The storage medium according to claim 27, further comprising a detection side transmission/reception step to transmit and receive infrared rays and a detection step having a comparison step to repeat reception data to said selection step when identification codes transmitted from said input step are coincident, wherein detection means is used at said detection step and is disposed at least at three different points on the display means, and distances from said input means to input images are measured at said distance measuring step by calculating a distance to each of the detection means.

* * * * *

UNITED STATES PATENT AND TRADEMARK OFFICE
CERTIFICATE OF CORRECTION

PATENT NO. : 7,148,909 B2
APPLICATION NO. : 09/316023
DATED : December 12, 2006
INVENTOR(S) : Hideaki Yui et al.

It is certified that error appears in the above-identified patent and that said Letters Patent is hereby corrected as shown below:

<u>COLUMN 4</u>:

Line 21, "corresponds to a control portion" should be deleted.

<u>COLUMN 11</u>:

Line 43, "hierarchys" should read --hierarchies--.
Line 50, "hierarchy" should read --hierarchy--.

<u>COLUMN 15</u>:

Line 29, "$\{[do^2-dx^2+dx^2)/2X\}^2]^{1/2}$" should read --$\{[do^2-dx^2+X^2)/2X\}^2]^{1/2}$--.

Signed and Sealed this

Twenty-seventh Day of January, 2009

JOHN DOLL
*Acting Director of the United States Patent and Trademark Office*